United States Patent
Ham

Patent Number: 5,459,373
Date of Patent: Oct. 17, 1995

[54] MINI-FLUORESCENT LAMP WITH AUTOMATIC ON/OFF

[76] Inventor: Byung I. Ham, 16550 E. Blackburn Dr., La Mirada, Calif. 90638

[21] Appl. No.: 321,541

[22] Filed: Oct. 12, 1994

[51] Int. Cl.⁶ .................................................. H05B 37/02
[52] U.S. Cl. ........................... 315/150; 315/156; 315/159
[58] Field of Search ................................. 315/150, 156, 315/159, 119, 134

[56] References Cited

U.S. PATENT DOCUMENTS 3,629,683  12/1971  Nuckolls .......................... 315/241 X
4,766,331   8/1988  Flegel et al. ...................... 315/159 X
4,789,810  12/1988  Ottenstein ........................... 315/308

Primary Examiner—Benny Lee
Assistant Examiner—Reginald A. Ratliff
Attorney, Agent, or Firm—Blakely, Sokoloff, Taylor & Zafman

[57] ABSTRACT

A circuit to reduce the amount of time for automatic turn-on of a fluorescent lamp as compared with a thermocouple by using a diode bridge, silicon controlled rectifier, a transistor, and a CdS photoelectric device. By using this relatively inexpensive circuit, a fluorescent lamp is automatically turned on within 2–3 seconds after ambient light falls below a predetermined level. In an alternate embodiment, there is no transistor and a Schmitt trigger is used.

2 Claims, 2 Drawing Sheets

MINI-FLUORESCENT LAMP WITH AUTOMATIC ON/OFF

BACKGROUND OF THE INVENTION

1. Field of the Invention

The present invention relates to a mini-lamp or night light with a fluorescent tube which is capable of automatic turn-on/turn-off operation, e.g., turn-on when the ambient light falls below a certain level and turn-off when the ambient light rises above a certain level.

2. Description of the Prior Art and Related Information

Fluorescent lamps of all types are very popular for use in the home or office because of their high operating efficiency as compared to incandescent lamps. Indeed, fluorescent lamps emit light at several times the efficiency of a typical incandescent lamp. Furthermore, fluorescent lamps do not generate as much heat as a typical incandescent bulb, thereby conserving radiant energy in that respect.

A typical fluorescent lamp is constructed from a glass tube that contains two electrodes at opposite ends, a coating of powdered phosphor covering the interior of the tube, and small amounts of mercury. The electrodes when energized provide a large potential across the tube which frees electrons to initiate an arc. The radiant energy from the arc contains shortwave ultraviolet energy that is converted into light by the phosphor coating. In this process, the fluorescent effect is caused by the mercury when it is vaporized in the arc.

Due to their operating requirements, fluorescent lamps are not usually used when automatic on/off operation is required or desired. For this reason, night lights, for which it is desired to have automatic on/off operation, typically utilize incandescent lamps with a photocell, with the photocell operating as an on/off switch. That is, when ambient light is above a predetermined level, the photocell causes power to be removed from the incandescent lamp, and when ambient light is below a predetermined level, the photocell causes power to be applied to the incandescent lamp. However, photocells are not suitable for use with fluorescent lamps in this manner because of the higher voltages and currents involved. The prior art method of providing an automatic on/off feature for a fluorescent lamps utilizes a bimetal thermocouple device in series with a cadmium sulfide (CdS) photoelectric device to switch the lamp on and off as shown in FIG. 1. The bimetal thermocouple device functions as a relay. A conventional relay could be used, with suitable modifications. However, the resulting device would be cost prohibitive.

The bimetal thermocouple device works as follows with reference to FIG. 1. As ambient light decreases to a predetermined level, the resistance of a CdS photoelectric device increases causing a decrease in current flow. This causes resistor R to cool down which in turn causes the bimetal thermocouple to contact one terminal of the fluorescent lamp thereby completing the circuit and switching fluorescent lamp F on. In a similar manner, as the ambient light rises above a predetermined level, the resistance of the CdS photoelectric device decreases. The resulting current increase flowing through resistor R, causes it to heat up which causes the bimetal thermocouple to lose contact with the terminal of the fluorescent lamp. This switches the lamp off. In FIG. 1, starter ST and inductor L are conventional components used in fluorescent lamp circuits in a manner well known to persons skilled in the art. Although such configuration works, the resistor R-bimetal thermocouple combination takes several minutes for the contact to the fluorescent lamp to be made or broken. Since consumers expect night lights to turn on as soon as a room light is switched off, the delay associated with a bimetal thermocouple is generally not acceptable. While a relay could provide an acceptable response time, relays are usually too expensive for devices such as night lights.

SUMMARY OF THE INVENTION

The circuit shown in FIG. 2 reduces the amount of time for automatic turn-on of a fluorescent lamp as compared with thermocouple by using a diode bridge, silicon controlled rectifier, a transistor, and a CdS photoelectric device. By using this relatively inexpensive circuit, a fluorescent lamp is automatically turned on within 2–3 seconds after ambient light falls below a predetermined level.

DETAILED DESCRIPTION OF THE INVENTION

The following is detailed description of a circuit suitable for use with a fluorescent lamp to provide an automatic, fast on/off capability at relatively low cost. In the following description, numerous details such as specific materials and configurations are set forth in order to provide a more complete understanding of the present invention. But it is understood by those skilled in the art that the present invention can be practiced without these specific details. In other instances, well-known elements are not described in detail so as not to obscure the present invention. In any event, the scope of the invention is best determined by reference to the appended claims.

Figure 1:
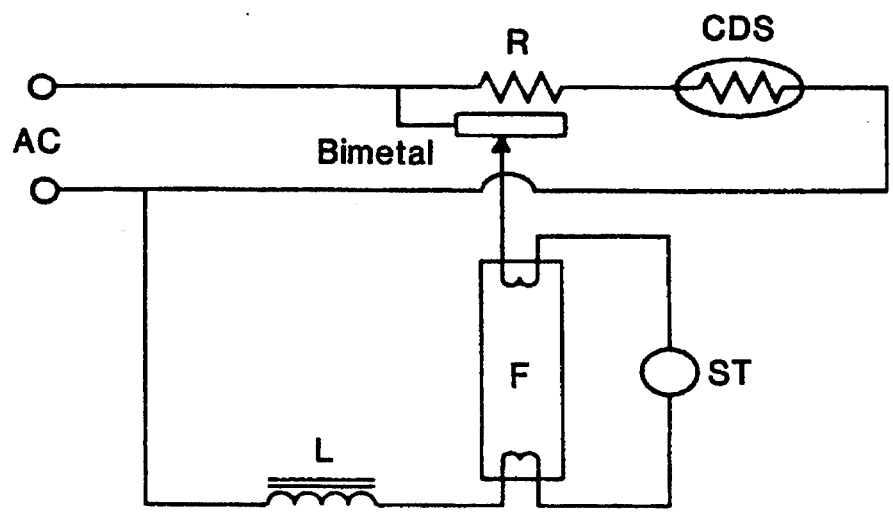
FIG. 1 is a schematic diagram of a prior art embodiment of an automatic circuit for turning on a low wattage mini fluorescent lamp.
Figure 2:
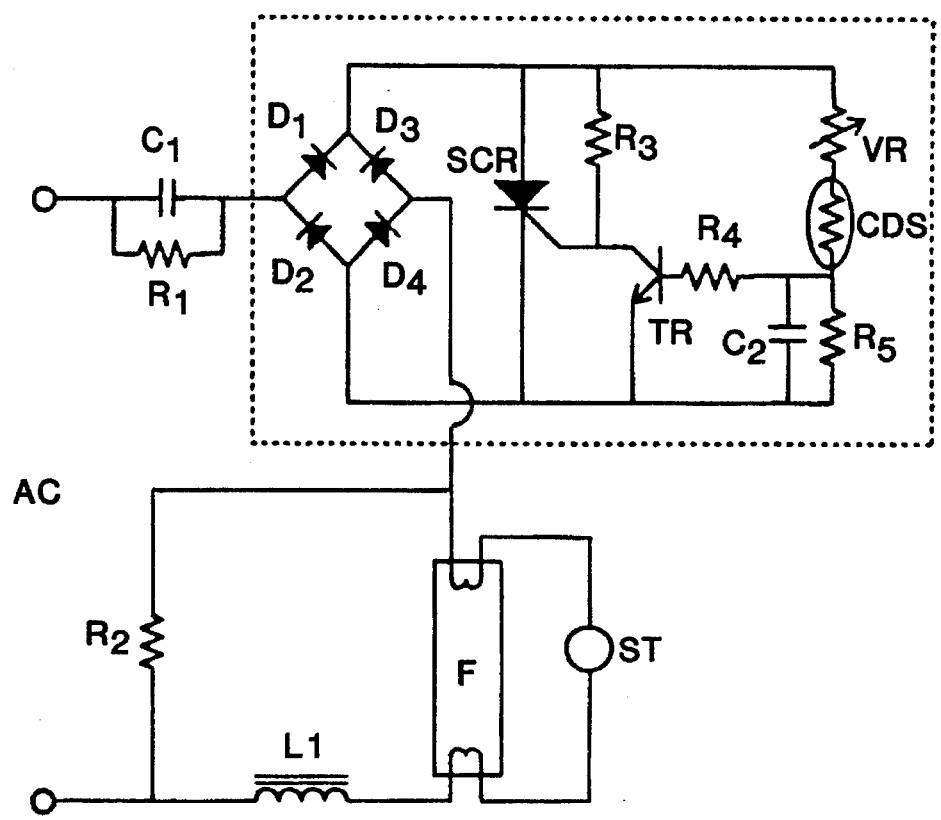
FIG. 2 is a schematic diagram of an embodiment of an automatic circuit for turning on a low wattage mini fluorescent lamp according to the present invention.

With reference to FIG. 2, a circuit is described which provides for automatic, fast turn-on of a fluorescent lamp with a decrease in the level of ambient light, and automatic turn-off with an increase in the level of ambient light, by using a diode bridge, a silicon controlled rectifier (SCR), a transistor (TR), and a CdS photoelectric device. By using this circuit, a fluorescent lamp is automatically turned on within 2–3 seconds in a low cost circuit.

In FIG. 2, $R_1$ is a bridge resistor ranging from 390 Kohms–1 Mohms which is used to discharge capacitor $C_1$. If the capacitance of $C_1$ is large, a small resistance $R_1$ is used. The resistance of $R_1$ is determined by the desired discharge time of capacitor $C_1$.

Diodes $D_1$–$D_4$ form a bridge circuit. The bridge circuit causes the current through fluorescent lamp F to always flow from the anode to the cathode of the fluorescent lamp when the SCR is ON.

Resistor $R_3$ provides a gate trigger current ($I_{GT}$) for the SCR.

Variable resistor VR is a potentiometer which is used to set the ambient light level which will cause the fluorescent lamp to be turned on. Variable resistor VR is set at a position as a function of the particular CdS photoelectric device being used and the ambient light level at which it is desired that the fluorescent light turn on and off. It is needed due to the variances in particular CdS photoelectric devices and the user desired ambient light level at which the fluorescent lamp should automatically turn on and off. Of course, the circuit will work without variable resistor VR, but then it would not be possible to change the ambient light level at which the fluorescent lamp turns on and off.

Resistor $R_4$ is the base resistor for transistor TR. In transistor TR, $I_C=I_B \cdot h_{fe}$, where $I_C$ is the collector current, $I_B$ is the base current, and $h_{fe}$ is the current gain of the transistor. If resistor $R_4$ is too large, $I_B$ becomes too small, and so does $I_C$. Transistor TR is used to provide a current flow through the gate of the SCR and maintain the SCR in the ON state.

The current that flows through variable resistor VR and the CdS photoelectric device determines the voltage across resistor $R_5$. In a typical circuit, if the voltage across resistor $R_5$ is more than 0.7 V, transistor TR is turned on. If the voltage across resistor R5 is less than 0.7 V, transistor TR is turned off.

Capacitor $C_2$ is used to prevent flickering of the lamp when the ambient light level becomes dark or it gets bright. If the capacitance of capacitor $C_2$ is too small, a flickering of the lamp occurs when the lamp is turned on because the turn on/off activating point is too short. Starter ST is a convention starter used to initiate the arc between the fluorescent lamp filaments. Inductor L1 is a conventional inductor used with fluorescent lamps to start with L dt/dt high voltage during ignition and to control the voltage after ignition. Resistor R2 is used to prohibit glow ignition.

In operation, when the ambient light falls below a predetermined level (as determined by the setting of variable resistor VR), the resistance of the CdS photoelectric device increases which causes the voltage across $R_5$ to increase to more than 0.7 V which causes transistor TR to be turned on. This causes the SCR to be turned off which prevents voltage from being applied to fluorescent lamp F thereby turning the lamp off. When the ambient light rises above the predetermined level, the resistance of the CdS photoelectric device decreases which causes the voltage across $R_5$ to fall below 0.7 V which causes transistor TR to be turned off. This causes the SCR to be turned on and provide the voltage needed for starter ST to activate so as to turn on fluorescent lamp F.

Figure 3:
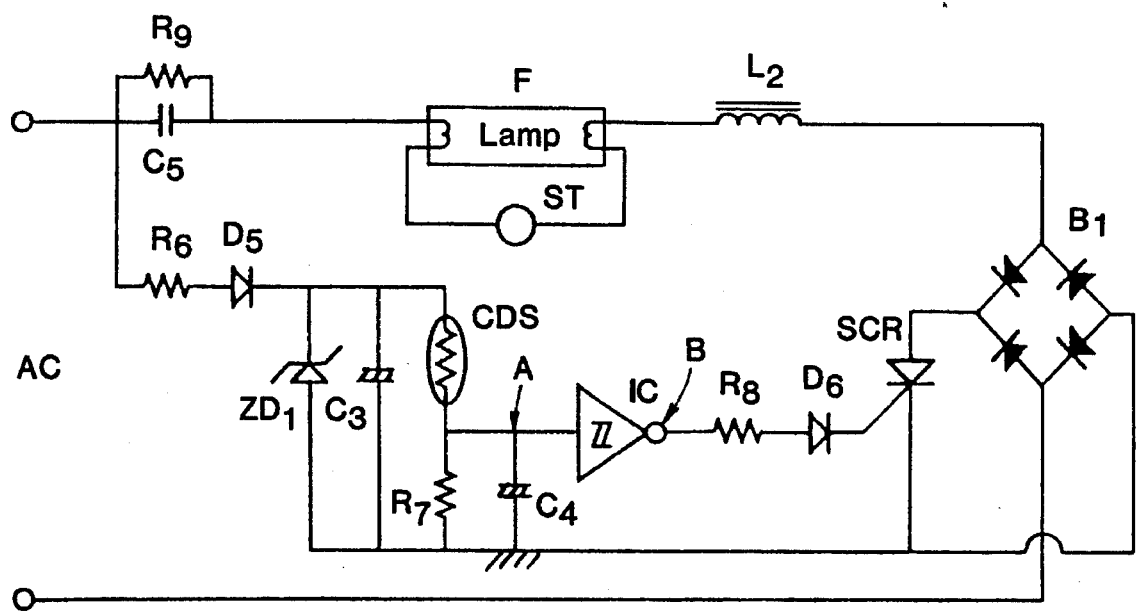
FIG. 3 is a schematic diagram of an alternate embodiment of an automatic circuit for turning on a low wattage mini fluorescent lamp according to the present invention.

FIG. 3 shows an alternate embodiment of a circuit used to implement the invention. In the circuit of FIG. 3, Resistor R6 is used to restrict the current to Schmitt trigger IC. Diode D5 converts the AC source to DC. Zener diode ZD1 is used to determine the trigger voltage of Schmitt trigger IC. Capacitor C3 is used to change the pulsating current to DC. The photocell, CDS, is a light sensor whose resistance decreases as ambient light increases and whose resistance increases as ambient light decreases. Capacitor C4 determines the state transition time of the Schmitt trigger. The silicon controlled rectifier (SCR) turns fluorescent lamp F on and off as a function of the trigger current of its gate. Resistor R8 restricts the $I_{GT}$ of the SCR. Diode D6 prevents the reverse current from the SCR from being passed to the Schmitt trigger. Resistor R9 is used to discharge the capacitor C5. Capacitor C5 is used to control the voltage through lamp F. Inductor L1 is used to control the current and to create high voltage during lamp ignition. Diode bridge B1 is used to operate the SCR using AC.

In operation, in the circuit of FIG. 3, when the ambient light rises above a predetermined level as determined by the breakdown voltage, the voltage at the junction of resistor R7 and capacitor C4 increases to greater than 3 V (HIGH or ON state). This causes the output of the Schmitt trigger to fall below 2.5 V (LOW or OFF state) which turns the SCR off. When the SCR is off, current no longer flows through the fluorescent lamp turning it off. When the ambient light falls below the predetermined level, the resistance of the CdS photocell increases causing the voltage at the junction of resistor R7 and capacitor C4 to fall below 2.5 V (LOW or OFF state). This causes the output of the Schmitt trigger to rise above 3 V (HIGH or ON state) which turns the SCR ON. This causes current to flow through the fluorescent lamp and starter ST turning the lamp on.

I claim:

1. A circuit for switching a fluorescent light on and off as a function of ambient light level comprising:
    a) a diode bridge (D1–D4) coupled to one terminal of a fluorescent lamp (F);
    b) a photocell (CDS) and a first resistor (R5) coupled to each other in series and to said diode bridge in parallel;
    c) a second resistor (R4) coupled between a junction of said photocell and said first resistor, and a base of a transistor (TR);
    d) a silicon controlled rectifier (SCR) coupled in parallel to said diode bridge and said photocell and whose gate is coupled to an emitter of said transistor;
    e) a third resistor (R3) coupled to said silicon controlled rectifier to provide a gate trigger current to said silicon controlled rectifier;
    f) a fourth resistor (R1) and a capacitor (C1) coupled to each other in parallel and coupled between said diode bridge and a terminal of an alternating current source, a second terminal of said alternating current source coupled to a second terminal of said fluorescent lamp;
    g) a variable resistor (VR) coupled in series with the photocell;
    h) a smoothing capacitor (C2) coupled in parallel with said first resistor (R5).

2. A circuit for switching a fluorescent light on and off as a function of ambient light level comprising:
    a) a fluorescent lamp having a first terminal coupled to a first terminal of an alternating current source;
    b) a diode bridge (B1) coupled between a second terminal of said fluorescent lamp and a second terminal of said alternating current source;
    c) a silicon controlled rectifier coupled to said diode bridge;
    d) a Schmitt trigger, a first resistor (R8) and a first diode (D6) coupled in series between a first terminal of a photocell and a gate of said silicon controlled rectifier;
    e) a second resistor (R7) and a first capacitor (C4) coupled to each other in parallel and coupled between a node common to said Schmitt trigger and said photocell and a ground potential;
    f) a Zener diode (ZD1) and a second capacitor (C3) coupled to each other in parallel and coupled between a second terminal of said photocell and said ground potential;
    g) a third resistor (R6), a second diode (D5) and a fourth resistor (R9) coupled in series between the second terminal of said photocell and the first terminal of said fluorescent lamp;

h) a third capacitor (C5) coupled between the first terminal of said alternating current source and the first terminal of the fluorescent lamp.

* * * * *